July 14, 1964    C. G. GORDON    3,140,722
HYDRAULIC UNLOADER VALVES
Filed May 29, 1961

INVENTOR.
CARROLL G. GORDON
BY
O'BRIAN & BLACKHAM
ATTORNEYS

United States Patent Office 3,140,722
Patented July 14, 1964

3,140,722
HYDRAULIC UNLOADER VALVES
Carroll G. Gordon, 3 William Court, Menlo Park, Calif., assignor of one-half to William F. Stoesser, Mountain View, Calif.
Filed May 29, 1961, Ser. No. 113,494
3 Claims. (Cl. 137—108)

This invention pertains to new and improved hydraulic unloader valves.

Hydraulic unloader valves are commonly used in connecting a source of hydraulic fluid such as, for example, a pump to a hydraulic system or circuit in order to regulate the pressure of fluid supplied to such a system or circuit between upper and lower values. In general they operate so as to bypass hydraulic fluid from such a source to an appropriate return or reservoir when the pressure within the hydraulic system or circuit exceeds a given, predetermined value and to cut off the flow of fluid to such a return or reservoir when the pressure within such a hydraulic system or circuit decreases below another given predetermined value. In general, these two values are as close together as practical so that the pressure within a hydraulic system is retained substantially constant.

In the past a large number of different types of unloader valves have been designed, constructed and used. In general, many such prior valves have been acceptable for the purpose for which they are intended. However, as a general rule such prior valves were not designed so as to operate satisfactorily at the relatively high pressures which during the past compartively few years have been used more and more frequently in hydraulic systems and circuits. Many of such prior valves have been relatively expensive to manufacture and construct. Various prior unloader valves have also been unsatisfactory from a utilitarian standpoint because of their performance characteristics under various extreme conditions such as are encountered in the aircraft and missile utilization.

A broad object of the present invention is to provide new and improved hydraulic unloader valves capable of being used with high pressure hydraulic fluids. Another object of the present invention is to provide valves of this type which are capable of prolonged, satisfactory performance under extreme conditions such as might tend to influence adversely the performance of various related structures. A still further object of the present invention is to provide hydraulic unloader valves which may be constructed at a comparatively nominal cost with a minimum amount of difficulty.

These and various other objects of the invention as well as many specific advantages of hydraulic unloader valves as herein described will be apparent to those skilled in the art to which this invention pertains from a detailed consideration of the remainder of this specification, including the appended claims and from the accompanying drawing in which:

Figure 1:
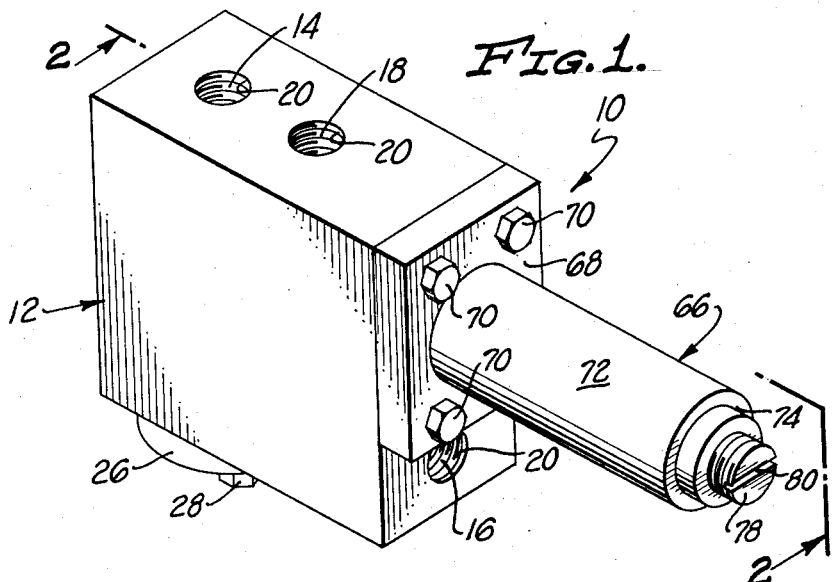
FIG. 1 is a perspective view of a presently preferred embodiment of a hydraulic unloader valve of this invention.

The accompanying drawing is primarily intended for explanatory purposes. From a consideration of this entire specification various individuals skilled in the design and construction of hydraulic valves will realize that the basic features or principles of this invention can be embodied within various valves which differ from the precise valve shown in the drawing as to various matters of an engineering character without departing from the features of this invention as defined in the appended claims.

As an aid to understanding this invention it can be stated in essentially summary form that it concerns hydraulic unloader valves, each of which is constructed so as to utilize inlet, system and return ports, check valve means connecting the inlet and the system ports and a passage connecting the inlet and the return port. In accordance with the present invention a valve seat is provided within this connecting passage and a valve body is movably mounted generally within the passage so as to be capable of being moved with respect to the valve seat in order to obtain a valving action. The present invention utilizes a spring and a piston arrangement which is connected to this valve body so as to counterbalance forces from the spring, fluid within the system port and the fluid within the inlet port in order to govern the motion of the valve body through the use of a mechanical connection linking this valve body to a piston located within a cylinder.

The actual details of this invention will best be more fully apparent from a detailed consideration of the accompanying drawing. Here there is shown a hydraulic unloader valve 10 of this invention which utilizes a block-like housing 12. This housing contains an inlet port 14, a supply port 16 and a return port 18. If desired, these ports may be considered "passages" although in describing the present invention this latter terminology is not utilized in the interest of clarity. The ports 14, 16 and 18 are provided with tapped ends 20 for use in connecting the housing 12 to appropriate hydraulic lines (not shown) when the entire valve 10 is utilized for its intended purpose.

Within the valve 10 there is provided a conventional ring-like valve seat 22 located between the inlet port 14 and the supply port 16. The housing 12 is also provided with an opening 24 opposite this valve seat 22. When the complete valve 10 is assembled, this opening 24 is closed by means of a cap 26 which is secured to the housing 12 through the use of bolts 28. A small conventional seal 30 is preferably used between the cap 26 and the housing 12 so as to prevent leakage. The cap 26 includes a cylindrical skirt 32 which acts as a retainer for a conventional type coil spring 34 and a ball valve body 36. This valve body 36 is normally biased by the spring 34 in the contact with the seat 22, but is capable of being moved out of engagement of this seat so as to allow hydraulic fluid to flow from the inlet port 14 through the seat 22 into the supply port 16.

The valve 10 also includes a connecting passage 38 which is located so as to interconnect the inlet port 14 and the return port 18. This passage 38 in the embodiment of the invention shown is of a cylindrical character; within the interior of it there is located a small ring 40 having a beveled surface 42 capable of serving as a valve seat, which surface 42 is located on the side of the ring 40 remote from the inlet port 14. This ring 40 may be secured within the passage 38 by known press-fitting or in other manners which are well known at this time. If desired, the ring 40 may be omitted and the surface 42 may be formed directly within the passage 38 in the housing 12.

A cylindrical bore 44 is preferably formed in the housing 12 so as to be axially aligned with the ring 40 and the passage 38 and so as to be in communication with the extremity of this passage 38 remote from the inlet port 14. This bore 44 contains a cylindrical sleeve 46 which fits tightly against its interior. If desired, appropriate seals 48 of a conventional variety may be located at the ends of the sleeve 46 so as to prevent leakage of the hydraulic fluid. Around the exterior of the sleeve 46 there is formed a groove 50 which is placed into communication with the supply port 16 through the use of a hole 52 leading through the housing 12 from the supply port 16 to the interior of the bore 44 opposite this groove 50. Another hole 54 leads from the groove 50 into an extremity of the cylindrical interior 56 within this sleeve 46. If desired, this cylindrical interior 56 may be considered as a cylinder since it holds a disc-like piston 58.

This piston 58 is adapted to be reciprocated within the interior of the sleeve 46 during the operation of the complete valve 10; this piston 58 carries an elongated, integrally formed piston rod 60 which extends from both sides of it. From an examination of FIG. 2 of the drawing it will be seen that the piston rod 60 extends through and closely fits within an opening 62 in an end 64 of the sleeve 46 adjacent to the connecting passage 38. It will also be seen that the sleeve 46 and the rod 60 are in axial alignment with the passage 38 and the ring 40.

Figure 2:
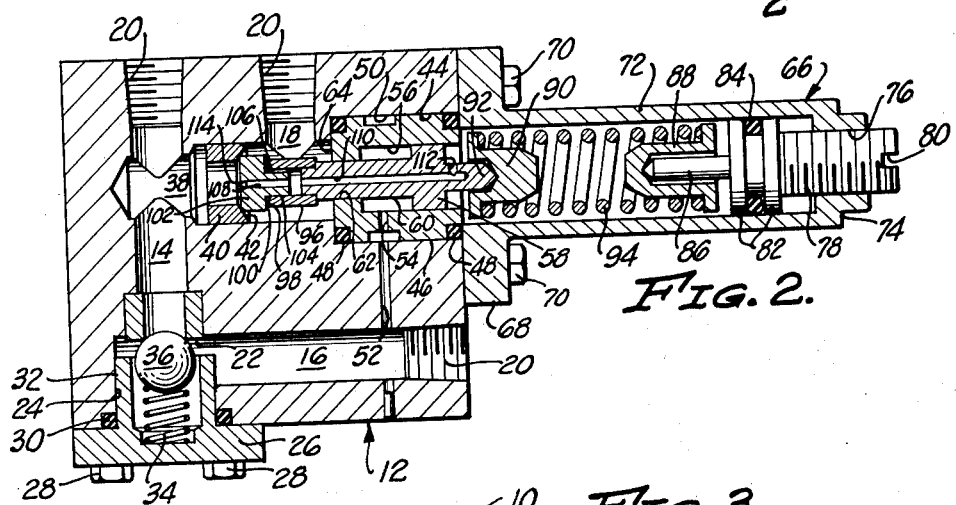
FIG. 2 is a cross-sectional view taken at line 2—2 of FIG. 1.
Figure 3:
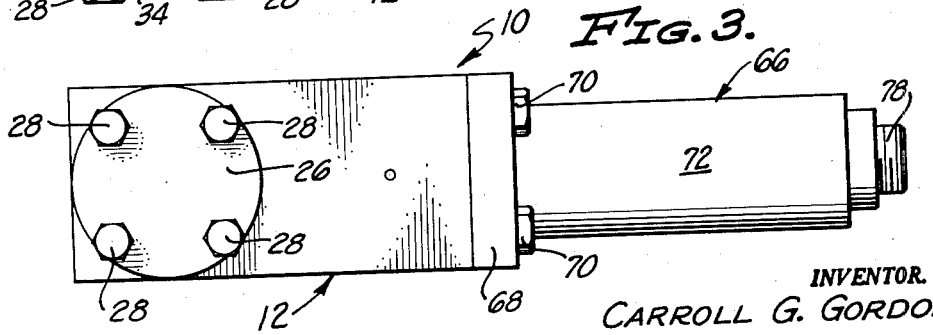
FIG. 3 is a bottom plan view of the valve shown in the preceding figures.

The extremity of the cylindrical interior 56 of the sleeve 46 remote from the connecting passage 38 is normally sealed by means of a hat-like housing 66 having a peripheral flange 68 which is secured to the housing 12 by means of bolts 70. As shown in FIG. 2 one of the seals 48 abuts against the flange 68 so as to form a seal with respect to it. This housing 66 includes a cylindrical wall 72 extending from the flange 68 and an end wall 74 enclosing the extremity of the wall 72 remote from the flange 68. The end wall 74 is provided with a threaded interior opening 76 which carries a small threaded shaft 78 in such a manner that the position of the shaft 78 may be adjusted by using a screwdriver or other appropriate instrument (not shown) in engagement with a slot 80 in the exposed extremity of it. The extremity of the shaft 78 within the wall 72 is provided with two spaced, transverse flanges 82 which fit closely against the interior of the wall 72. Preferably a conventional elastomeric sealing ring 84 is located between the flanges 82 for the purpose of forming a seal within this housing 66.

The extremity of the shaft 78 within this wall 72 also carries a pointed rod 86. The extremity of this rod 86 carries a small hat-like spring retainer 88 of known design. A corresponding spring retainer 90 is normally located upon a pointed end 92 of the rod 60 as shown. A conventional coil spring 94 is biased between these retainers 88 and 90. Obviously the pressure upon this spring 94 is capable of being adjusted with this construction by adjusting the position of the shaft 78 as previously described. With the complete valve 10 the spring 94 normally serves to urge or bias the piston 58 and the rod 60 toward the surface 42 of the ring 40.

The end of the rod 60 located generally within the connecting passage 38 carries an annular secondary valve body 96 of cylindrical shape. This secondary valve body 96 is provided with a peripheral sealing edge 98 which is adapted to seat against a surface 100 of a primary valve body 102 so as to form a seal with respect to it during the operation of the entire valve 10. From a consideration of the drawing it will be realized that this primary valve body 102 is of a disc-like, cylindrical shape and that an edge of it is adapted to seat against the surface 42 so as to form a seal with it. The primary valve body 102 includes a shaft 104 which fits within the interior of the secondary valve body 96 so as to be slidable with respect to this secondary valve body 96 and the rod 60.

A small pressure supply groove 106 is located along the length of the periphery of the shaft 104 for a purpose as hereinafter described. A small hole 108 leads completely through the primary valve body 102 and through the shaft 104 in the construction shown. Another corresponding, aligned hole 110 leads through the interior of the rod 60 and is placed in communication with the extremity of the cylindrical interior 56 on the side of the piston 58 remote from the connecting passage 38 by means of a further hole 112. Preferably the extremity 114 of the hole 108 closest adjacent to the inlet port 14 is of a restricted dimension so as to constitute an orifice serving to regulate the flow of hydraulic fluid from the inlet port 14. From the foregoing it will be realized that the valve bodies 96 and 102 are axially aligned with the ring 40 and the sleeve 46 and the cylindrical interior 56.

During the utilization of the valve 10 hydraulic fluid from an appropriate source (not shown) such as a pump is introduced into the inlet port 114. Such fluid will, of course, exert a force against the valve body 102 tending to move this body 102 away from the surface 42 and tending to move the rod 60 to the right. If the pressure within this inlet port exceeds the pressure within the hydraulic circuit or system (not shown) connected to the supply port 16 the ball 36 is forced against the spring 34 away from the valve seat 22 permitting flow from the inlet port 14 into the supply port 16 and, of course, into the circuit or system attached to this port 16. As hydraulic fluid flows into the supply port 16 some of it will flow through the hole 52 into the groove 50 and then through the hole 54 into the cylindrical interior 56 of the sleeve 46 so as to exert a pressure against an end of the piston 58 tending to bias or move this piston 58 generally away from the connecting passage 38. If desired the holes 52 and 54 and the groove 50 may be termed "communication means" since they serve to connect parts of the valve 10 as described. The forces exerted in this manner against the piston 58 will, of course, be dependent upon the pressure of the hydraulic fluid within the supply port 16.

Both of these forces tending to move the piston 58 to the right as it is viewed in FIG. 2 will, of course, be opposed by forces exerted by the spring 94. They are also opposed by forces derived from the pressure of hydraulic fluid within the inlet port 14 by virtue of the fact that this inlet port 14 is connected to an extremity of the cylindrical interior 56 remote from the connecting passage 38 by means of centrally located holes 108, 110 and 112. These holes may be considered "communication means"; they serve to convey hydraulic fluid from the inlet port 14 so that forces from this fluid work against the side of the piston 58 remote from the connecting passage 38 so as to tend to bias the rod 60 toward a position in which the secondary and primary valve bodies 102 and 96 form seals against the surfaces 100, 42, respectively. The force from hydraulic fluid pressing against the right side of the piston 58 as viewed in FIG. 2 also, of course, pushes against the pointed end 92 of the rod 60.

When the valve 10 is utilized and as the pressure within the supply port 16 is being brought up to a predetermined value the combined spring and hydraulic forces working against the piston 58 so as to hold the edge 98 against the surface 100 and so as to hold the valve body 102 against the surface 42 are sufficient so as to prevent any flow from the inlet port 14 into the return port 18. When, however, the pressure within the supply port 16 increases to a desired value which is dependent upon the amount of compression upon the spring 94 the combined forces acting so as to move the piston 58 to the right as viewed in FIG. 2 will serve to move the piston 58 and the secondary valve body 96 away from the surface 100 of the primary valve body 102. This will allow the escape of fluid from within the housing 66 and the hole 110 through the groove 106 between the surface 100 and the edge 98 into the return port 18. As fluid escapes into the return port 18 in this manner some fluid will tend to move into the area within the interior of the secondary valve body 96 through the hole 108 in the primary valve body 102. Such flow of fluid from the inlet port 14 will, however, be restricted by virtue of the orifice 114. Hence, the net effect of the escape of fluid between the primary and secondary valve bodies 102 and 96, respectively, will be a drop in the forces tending to hold the primary valve body 102 in a closed position, and the force from hydraulic fluid within the inlet port 14 will tend to move this primary valve body 102 to the right as viewed in FIG. 2. This, of course, will be because the pressures at the right hand side of the primary valve body 102 will be reduced by the escape of fluid into the comparatively low pressure return port 18. When the primary valve body 102 has been moved in this manner so as to be positioned away from the surface 42 fluid will flow directly from the inlet port 14 into the return port 18 along the surface 42.

The particular shape of this surface 42 which is presently preferred with this invention is a 45° bevel. It is also preferred to have the portions of the primary valve body 102 which meet the surface 42 shaped so as to provide walls at each side of a contacting edge of the body 102 which are located at a 90° angle with respect to one another so that the "valving" parts are formed in such a manner as to effectively reduce the effect of viscous pressure forces encountered with high pressure hydraulic fluids and so as to thus reduce the pressure drop across the area between the surface 42 and the primary valve body 102.

When the fluid pressure within the supply port 16 decreases the forces acting upon the piston 58 and derived from hydraulic fluid within the supply port 16 will, of course, drop. When the point is reached at which the spring 94 is sufficient to overcome the force components described in the preceding in connection with the movement of the primary and secondary valve bodies 102 and 96 this spring will urge or bias the rod 60 to the left as viewed in FIG. 2 so as to cause the secondary valve body 96 to slide upon the shaft 104 until such time as the edge 98 abuts against the surface 100. As the motion of the rod 60 to the left as viewed in FIG. 2 continues this secondary valve body 96 will force the primary valve body 102 so as to bring it into contact with the surface 42, blocking off the flow of fluid through the passage 38 from the inlet port 14 to the return port 18.

From a consideration of the foregoing those skilled in the art to which this invention pertains will realize that the operation of the valve 10 will depend upon the dimensions of the areas subjected to forces derived from hydraulic fluid. Depending upon the manner in which a valve, such as the valve 10 is manufactured, the sensitivity of such a valve may be made within any percentage range common in the hydraulic field.

Those skilled in the art to which this invention pertains will realize that hydraulic unloader valves as herein described can be operated satisfactorily at elevated high pressures and that they do not "chatter" at such pressures. They will further realize that hydraulic unloader valves as herein described are very efficient for the purposes intended, and that they may be easily and conveniently manufactured at comparatively nominal costs. Because of the nature of this invention it is to be considered as being limited solely by the appended claims forming a part of this disclosure.

I claim:

1. In a hydraulic unloader valve having a housing, inlet, system and return ports, check valve means connecting said inlet and system ports for permitting fluid flow between said inlet and said system ports, a structure which comprises: passage means including a valve seat located so as to connect said inlet and said return ports, cylinder means located adjacent to said connecting passage, piston means movably mounted in said cylinder means, a piston rod attached to said piston means so as to lead therefrom adjacent to said valve seat, valve body means mounted on said piston rod, said valve body means being capable of seating against said valve seat so as to form a seal, said valve body means comprising a primary valve body and a secondary valve body, said secondary valve body being secured to said piston rod so as to be movable therewith and connected to valve between one side of said piston means and said return port, said primary valve body being slideably positioned with respect to said secondary valve body, and said secondary valve body being capable of forming a seal against said primary valve body to inhibit flow from said one side of said piston means to said return port, said primary valve body being capable of forming a seal against said valve seat to inhibit flow from said inlet port to said return port, spring means for applying force to said piston rod so as to bias said valve body means into engagement with said valve seat, said spring means being operatively associated with said piston rod and said housing, and first connection means for introducing inlet pressure into said cylinder means against said one side of said piston means so that inlet pressure urges said piston rod and said valve body against said valve seat, and second communication means for introducing system pressure into said cylinder means on the side of said piston means remote from said first connecting passage means so that system pressure tends to bias said rod and said valve seat to an open position.

2. In a hydraulic unloader valve having a housing, inlet, system and return ports, check valve means connecting said inlet and system ports for permitting fluid flow between said inlet and said system ports, a structure which comprises: passage means including a valve seat located so as to connect said inlet and said return ports, cylinder means located adjacent to said connecting passage, piston means moveably mounted in said cylinder means, a piston rod attached to said piston means so as to lead therefrom adjacent to said valve seat, valve body means mounted on said piston rod, said valve body means being capable of seating against said valve seat so as to form a seal, spring means for applying force to said piston rod so as to bias said valve body means into engagement with said valve seat, said springs means being operatively associated with said piston rod and said housing, and first connection means for introducing inlet pressure into said cylinder means against one side of said piston means so that inlet pressure urges said piston rod and said valve body against said valve seat, said first connection means comprising a series of holes in communication with one another and extending through said valve body means, said piston rod and said piston means, and including orifice means located in said hole in said valve body means, and second connection means for introducing system pressure into said cylinder means on the side of said piston means remote from said first connection means so that system pressure tends to bias said rod and said valve seat to an open position.

3. In a hydraulic unloader valve having a housing, inlet, system and return ports, a check valve connecting said inlet and said system ports, a structure which comprises: passage means leading between said inlet and return ports, a beveled surface capable of serving as a valve seat extending around an axis and located within said passage means so that the larger dimension of said beveled surface is hydraulically closer to said return port than said inlet port, cylinder means in axial alignment with said axis located on said housing, piston means positioned within said cylinder means intermediate the ends thereof, a piston rod attached to said piston means so as to extend in axial alignment with said cylinder means from said piston through an end of said cylinder means and into said passage means at the extremity thereof adjacent to said return port, valve body means mounted upon the extremity of said piston rod within said passage means, said valve body means including a primary valve body capable of being moved against said beveled surface to inhibit flow from said inlet port to said return port, said valve body means further including a cylindrical secondary valve body secured to said piston rod within said passage means so as to be in axial alignment with said piston rod, said secondary valve body having a peripheral sealing edge located remote from said piston rod, the secondary valve body of disc-like shape having a shaft formed thereon, said shaft extending into the interior of said secondary valve body so as to slidably position said primary valve body on said secondary valve body, said primary valve body being in axial alignment with said piston rod and being capable of being moved into engagement said said beveled surface by engagement of said sealing edge on said secondary valve body with said primary valve body so as to move said primary valve body, said primary valve body including groove means formed in the periphery of said shaft for allowing the escape of hydraulic fluid to said return port from the interior of said secondary valve body is moved so as to space said sealing edge from said primary valve body, first hole means extending through said valve body means, said piston rod and said piston means so as to convey hydraulic fluid from said inlet port to the side of said piston remote from said inlet port, said return port and said passage means, other hole means connecting the interior of said cylinder means on the side of said piston means adjacent to said inlet port, said return port and said passage means to said system port, and spring means operatively associated with said housing and said piston rod for biasing said piston rod to a position in which said valve body means is seated against said beveled surface.

References Cited in the file of this patent

UNITED STATES PATENTS

| | | |
|---|---|---|
| 2,580,127 | Renick | Dec. 25, 1951 |
| 2,680,447 | Groves | June 8, 1954 |
| 2,737,966 | Lucien | Mar. 13, 1956 |
| 3,049,141 | Beatty et al. | Aug. 14, 1962 |